US012570136B2

(12) United States Patent
Jung et al.

(10) Patent No.: US 12,570,136 B2
(45) Date of Patent: Mar. 10, 2026

(54) BATTERY MODULE AND BATTERY PACK INCLUDING THE SAME

(71) Applicants: HYUNDAI MOTOR COMPANY, Seoul (KR); KIA CORPORATION, Seoul (KR)

(72) Inventors: Ji Woong Jung, Anyang-si (KR); Yong Hwan Choi, Seoul (KR); Yu Ri Oh, Hwaseong-si (KR); Tae Hyuck Kim, Anyang-si (KR); Gyung Hoon Shin, Seoul (KR); Hae Kyu Lim, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/678,006

(22) Filed: May 30, 2024

(65) Prior Publication Data

US 2024/0308323 A1       Sep. 19, 2024

Related U.S. Application Data

(62) Division of application No. 17/395,113, filed on Aug. 5, 2021, now Pat. No. 12,024,006.

(30) Foreign Application Priority Data

Oct. 20, 2020     (KR) ........................ 10-2020-0136238

(51) Int. Cl.
| | |
|---|---|
| *H01M 10/625* | (2014.01) |
| *B60K 1/04* | (2019.01) |
| *B60L 50/60* | (2019.01) |
| *B60L 50/64* | (2019.01) |
| *H01M 50/20* | (2021.01) |
| *H01M 50/204* | (2021.01) |
| *H01M 50/258* | (2021.01) |
| *H01M 50/262* | (2021.01) |
| *H01M 50/271* | (2021.01) |
| *H01M 50/502* | (2021.01) |

(52) U.S. Cl.
CPC ................ *B60K 1/04* (2013.01); *B60L 50/64* (2019.02); *B60L 50/66* (2019.02); *H01M 10/625* (2015.04); *H01M 50/20* (2021.01);

*H01M 50/204* (2021.01); *H01M 50/258* (2021.01); *H01M 50/262* (2021.01); *H01M 50/271* (2021.01); *H01M 50/502* (2021.01)

(58) Field of Classification Search
CPC ........... B60K 1/04; B60L 50/64; B60L 50/66; H01M 10/625; H01M 50/20; H01M 50/204; H01M 50/258; H01M 50/262; H01M 50/271; H01M 50/502; H01M 50/249; H01M 50/211; H01M 50/242; H01M 50/233; H01M 2220/20; Y02E 60/10; Y02T 10/70
See application file for complete search history.

(56) References Cited

U.S. PATENT DOCUMENTS

| | | | |
|---|---|---|---|
| 8,034,476 B2 | 10/2011 | Shin | |
| 8,071,234 B2 | 12/2011 | Okada | |
| 2017/0062781 A1* | 3/2017 | Kim .................... | H01M 50/262 |
| 2018/0023608 A1 | 1/2018 | Matsushima | |
| 2018/0312200 A1* | 11/2018 | Kawase .............. | B62D 21/157 |
| 2019/0148690 A1 | 5/2019 | Newman | |
| 2019/0372069 A1* | 12/2019 | Lee .................... | H01M 50/262 |
| 2020/0083502 A1 | 3/2020 | Fan et al. | |

FOREIGN PATENT DOCUMENTS

| | | |
|---|---|---|
| CN | 210576106 U | 5/2020 |
| EP | 1939956 A1 | 7/2008 |
| JP | 2012169171 A | 9/2012 |
| KR | 20120062260 A | 6/2012 |
| KR | 20180113906 A | 10/2018 |
| KR | 20190124368 A | 11/2019 |
| WO | 2008035872 A1 | 3/2008 |
| WO | 2020163285 A1 | 8/2020 |

* cited by examiner

*Primary Examiner* — Muhammad S Siddiquee
(74) *Attorney, Agent, or Firm* — Lempia Summerfield Katz LLC

(57) ABSTRACT

A battery pack comprises a plurality of battery modules. Each battery module of the plurality of battery modules includes: a stacked structure including a plurality of stacked battery cells; and a front cover and a rear cover respectively disposed on a front side and a rear side of the stacked structure, configured to cover the stacked structure, and including a cover surface facing the stacked structure, a first fastening portion laterally protruding from a first side of the stacked structure in a stacking direction of the plurality of stacked battery cells, and a second fastening portion laterally protruding from a second side of the stacked structure in the stacking direction.

9 Claims, 8 Drawing Sheets

BATTERY MODULE AND BATTERY PACK INCLUDING THE SAME

CROSS REFERENCE TO RELATED APPLICATION

This application is a divisional application of non-provisional U.S. patent application Ser. No. 17/395,113, filed on Aug. 5, 2021, which claims priority to and the benefit of Korean Patent Application No. 10-2020-0136238, filed on Oct. 20, 2020, the entire contents of each of which are incorporated herein by reference.

FIELD

The present disclosure relates to a battery module and a battery pack including the battery module.

BACKGROUND

The statements in this section merely provide background information related to the present disclosure and may not constitute prior art.

In line with recent global trends toward carbon dioxide emission reduction, there has been an increasing demand for electric cars that produce traveling power by driving motors with electric energy stored in energy storage devices (for example, batteries), instead of conventional cars having internal combustion engines to produce traveling power by means of combustion of fossil fuel.

The performance of an electric car heavily depends on the capacity and performance of the energy storage device (for example, battery) for storing electric energy to be supplied to the driving motor.

Vehicle batteries for storing electric energy to be supplied to motors to produce traveling power for the vehicles desirably have not only excellent electric characteristics (for example, excellent charging/discharging performance and long service life), but also high-level mechanical performances (for example, robustness against harsh vehicle traveling environments, such as high temperatures and severe vibrations).

In addition, it is advantageous in terms of vehicle manufacturers to configure battery hardware in the form of modules having a standardized size or capacitance such that the same can be consistently applied to various kinds of vehicles.

The above descriptions regarding background arts are only for helping understanding of the background of the present disclosure, and are not to be considered by a person skilled in the art as corresponding to already-known prior arts.

SUMMARY

The present disclosure provides a battery module having a size and a capacity standardized such that the same can be consistently applied to various kinds of vehicles, and a battery pack including the battery module.

Particularly, the present disclosure provides a battery module having such a structure that, when a battery pack is to be configured, the same can be firmly fastened to an adjacent battery module, and a battery pack including the battery module.

In one form of the present disclosure a battery module includes: a stacked structure including a plurality of stacked battery cells and a first fastening portion and a second fastening portion laterally protruding further from sides of the stacked structure in a stacking direction of the battery cells; and a front cover and a rear cover respectively disposed on a front side and a rear side of the stacked structure, configured to covering the stacked structure, has and including a cover surface facing the stacked structure.

In one form of the present disclosure, the first fastening portion and the second fastening portion each may have a through-hole formed in an up-down direction.

In one form of the present disclosure, the first fastening portion and the second fastening portion may have a height difference from each other.

In one form of the present disclosure, an upper end of the first fastening portion and a lower end of the second fastening portion may have substantially the same height.

In one form of the present disclosure, a metal bush may be disposed in the through-hole of the higher fastening portion of the first fastening portion and the second fastening portion, and an insert nut may be disposed in the lower fastening portion.

In one form of the present disclosure, each of the covers may further have an extension structure connected to the first fastening portion and the second fastening portion from the cover surface, and the extension structure may be formed in a lattice structure having holes.

In one form of the present disclosure, the extension structure may have a structure extending at an angle from a center of the cover surface to the first fastening structure and the second fastening structure, and an empty space may be defined between the first fastening portion and the second fastening portion.

In another form, the present disclosure provides a battery pack including a plurality of battery modules each including: a stacked structure including a plurality of stacked battery cells and a first fastening portion and a second fastening portion laterally protruding further from sides of the stacked structure in a stacking direction of the battery cells; and a front cover and a rear cover respectively disposed on a front side and a rear side of the stacked structure, configured to cover the stacked structure, and including a cover surface facing the stacked structure, wherein the battery modules are arranged adjacent to each other in a stacking direction of the battery cells, the first fastening portion of one of two adjacent battery modules and the second fastening portion of the other battery module overlap each other in a height direction in the arranged state, and the first fastening portion and the second fastening portion overlapping each other of the different battery modules are fastened to each other.

In one form of the present disclosure, the first fastening portion and the second fastening portion each may have a through-hole formed therethrough in an up-down direction, the through-holes respectively formed through the first fastening portion and the second fastening portion of adjacent overlapping battery modules may be aligned with each other in the height direction.

In one form of the present disclosure, an upper end of the first fastening portion and a lower end of the second fastening portion may be positioned at substantially the same height.

In one form of the present disclosure, a metal bush may be disposed in the through-hole of the higher fastening portion of the first fastening portion and the second fastening portion, and an insert nut may be disposed in the lower fastening portion.

In one form of the present disclosure, the battery pack may further include a fastening member inserted in the through-holes aligned with each other and fastening the adjacent battery modules to each other.

In one form of the present disclosure, the fastening member may be a hollow nut.

In one form of the present disclosure, the battery pack may further include a hollow nut inserted in the through-holes aligned with each other and coupled to the insert nut through the metal bush.

In one form of the present disclosure, the cover may further have an extension structure connected to the first fastening portion and the second fastening portion from the cover surface, and the extension structure may be formed in a lattice structure having holes.

In one form of the present disclosure, the extension structure may have a structure extending at an angle from a center of the cover surface to the first fastening structure and the second fastening structure, and an empty space may be defined between the first fastening portion and the second fastening portion.

According to the battery module and the battery pack including the same, the fastening portions formed on the front and rear covers of the battery module enable a fastening structure that may be applied for fastening the battery module and a case concurrently with fastening the battery module with another battery module, thereby further improving the strength of fastening, and this may provide a higher level of robustness against external impacts (for example, collisions).

In addition, according to the battery module and the battery pack including the same, any undesired space between battery modules can be removed, thereby increasing space utilization in connection with the overall battery system packaging, and this is very advantageous for standardization and compatibility.

In addition, according to the battery module and the battery pack including the same, fastening portions are formed such that fastening can be made in the direction in which battery cells are stacked inside the battery module. As a result, when multiple battery modules are fastened, the surface-pressure performance can be improved by the close-contact structure between the battery modules, and assembly convenience is improved, thereby providing various process-related advantages.

Advantageous effects obtainable from the present disclosure are not limited to those mentioned above, and other advantageous effects not mentioned herein could be clearly understood by those skilled in the art to which the present disclosure pertains.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
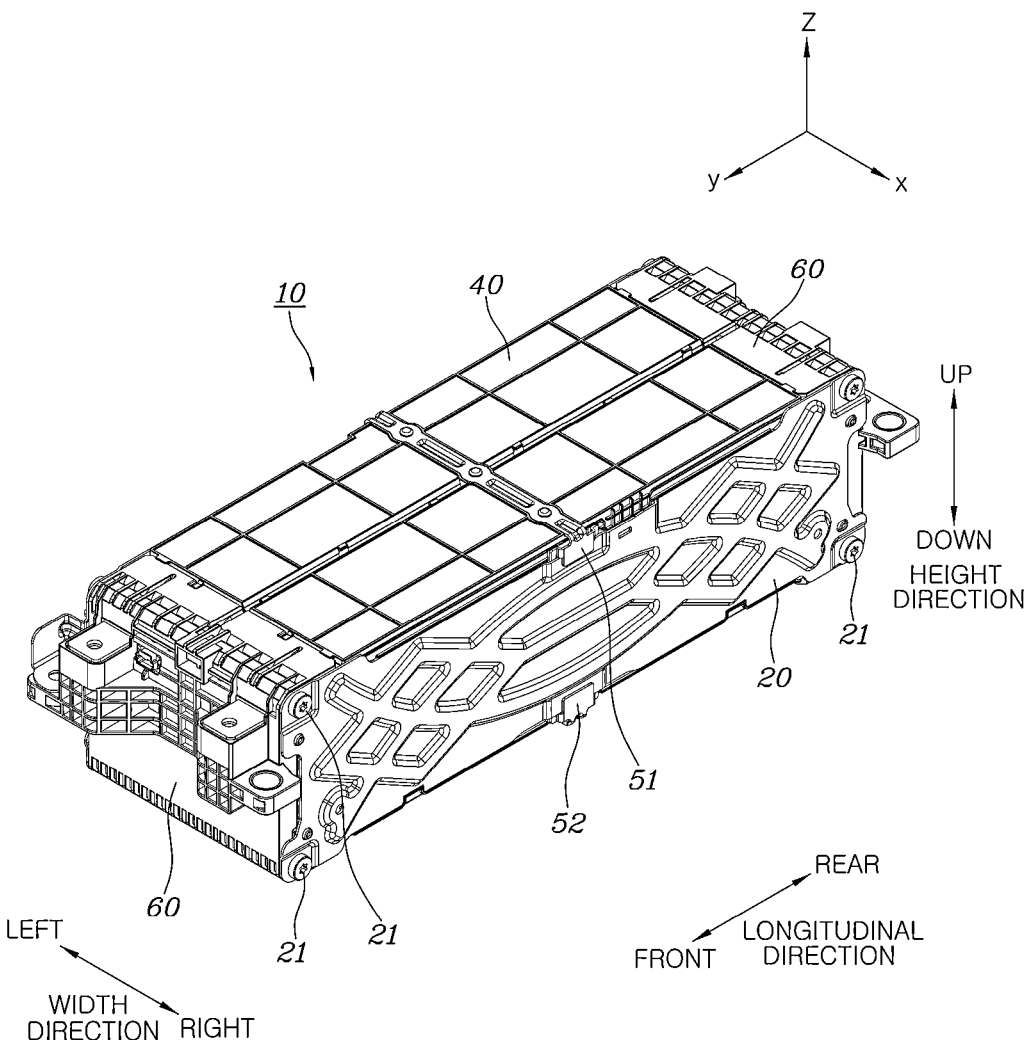
FIG. 1 is a perspective view of a battery module according to one form of the present disclosure seen from above.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereafter, a battery module according to various forms and a battery pack including the battery module are described in detail with reference to the accompanying drawings.

Figure 2:
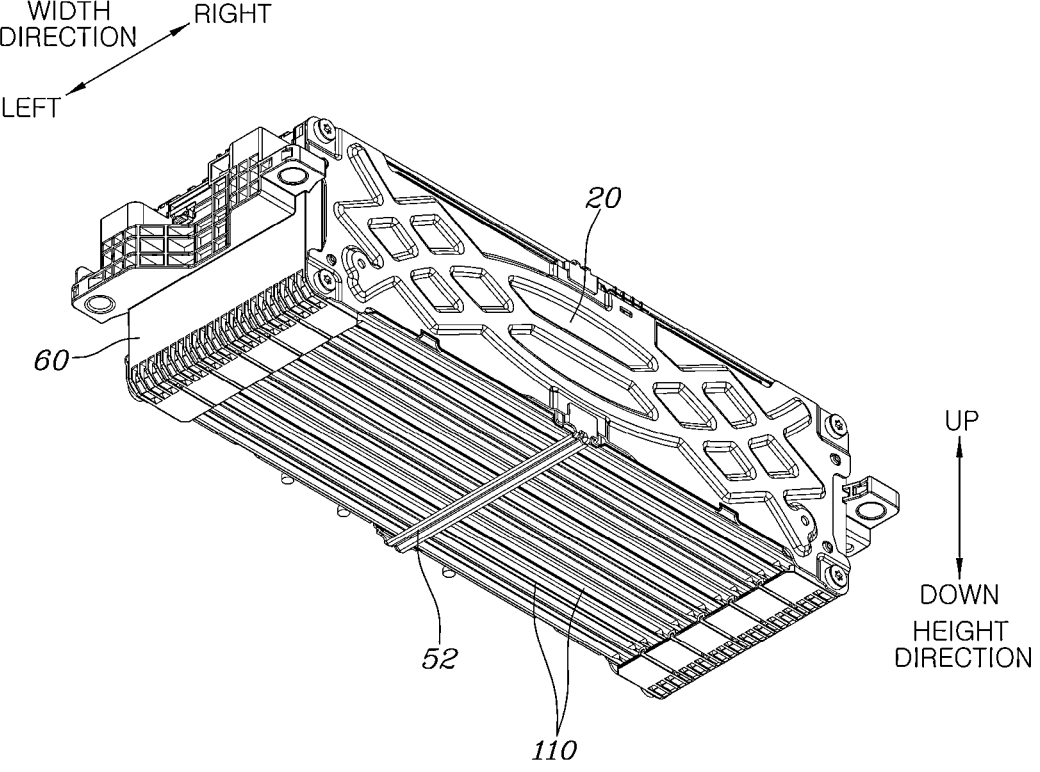
FIG. 2 is a perspective view of the battery module shown in FIG. 1 seen from the bottom.
Figure 3:
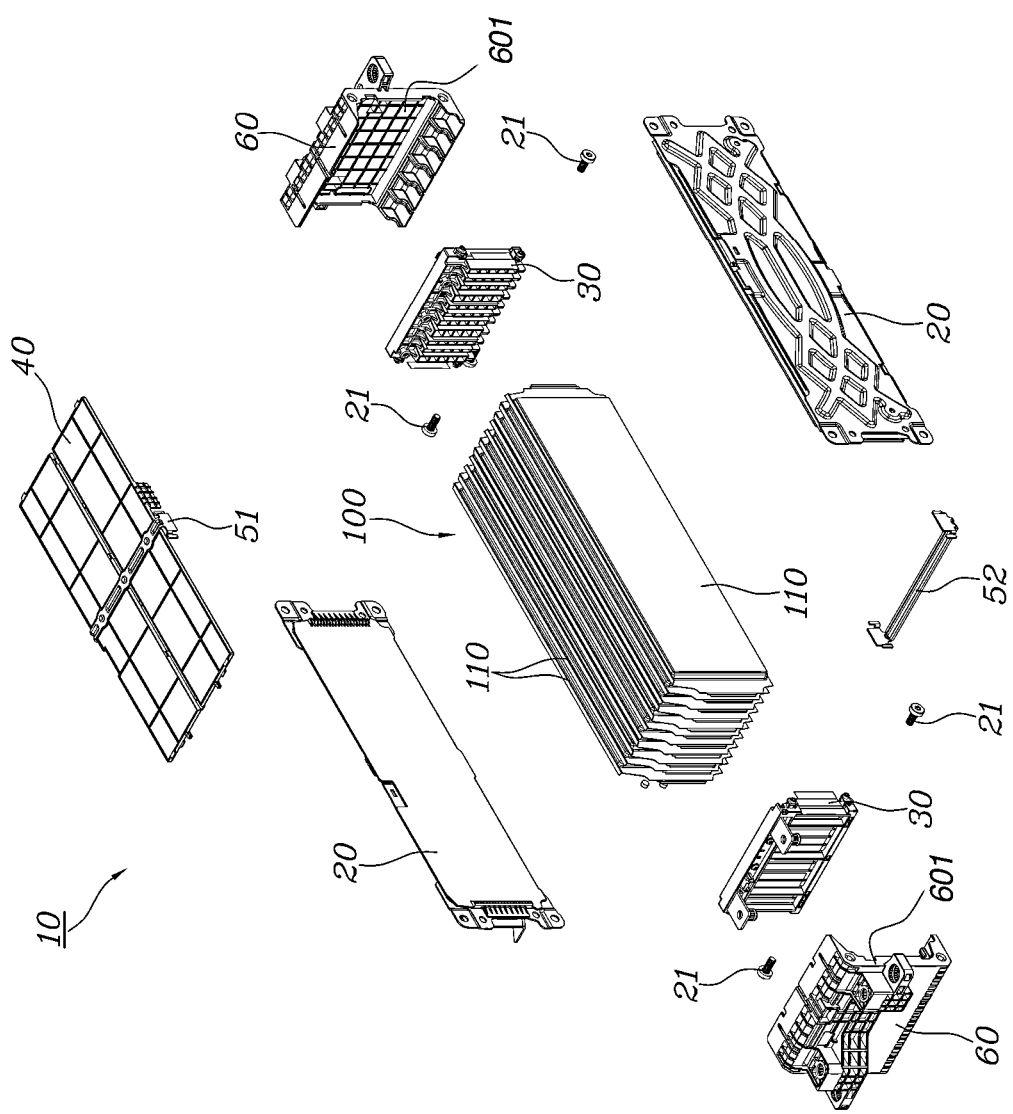
FIG. 3 is an exploded perspective view of the battery module shown in FIG. 1.

FIG. 1 is a perspective view of a battery module according to one form of the present disclosure seen from above, FIG. 2 is a perspective view of the battery module shown in FIG. 1 seen from the bottom, and FIG. 3 is an exploded perspective view of the battery module shown in FIG. 1.

Hereafter, for the convenience of description, as shown in FIGS. 1 and 2, the direction that covers 60 of a battery module 10 face is referred to as a front-rear direction, the direction corresponding to the distance between the covers 60 is referred to as a longitudinal direction, the direction in which battery cells 110 are stacked, that is, the direction that the end plates 20 of the battery module 10 face is referred to as a left-right direction, the direction corresponding to the distance between the end plates 20 is referred to as a width direction, the direction that an upper cover 40 faces is referred to as an upward direction, the direction opposite to the upward direction is referred to as a downward direction, and the direction corresponding to the distance between the surface on which the upper cover 40 is disposed and the opposite surface is referred to as a height direction. These expressions are based on the common method of expressing the size of an object, and the width direction, the longitudinal direction, and the height direction may be perpendicular to one another.

Referring to FIGS. 1 to 3, a battery module 10 according to one form of the present disclosure may include: a plurality of battery cells 110 stacked in the width direction; a pair of end plates 20 respectively being in surface contact with both width-directional ends of the structure 100 of the stacked battery cells 110; a pair of bus bar assemblies 30 disposed at both longitudinal ends of the structure 100 of the stacked battery cells 110 and bonded to electrodes of the battery cells 110; an upper cover 40 covering the top of the structure 100 of the stacked battery cells 110 in the height direction; a first clamp 51 bonded at both ends to each of the end plates 20; and a second clamp 52 extending in the width direction under the structure 100 of the stacked battery cells 110 and having both ends respectively bonded to the two end plates 20.

In particular, the battery module according to one form of the present disclosure may include a front cover and a rear cover 60 longitudinally covering the structure 100 of the stacked battery cells 110 outside the bus bar assemblies 30.

The battery cell 110 may be implemented in a pouch type having electrodes at both longitudinal ends and one battery cell-stacked structure 100 can be formed by stacking such battery cells 110 in the width direction.

Though not shown, a surface pressure pad having compressive elasticity to be able to maintain surface pressure at a predetermined level and absorb expansion of the battery cells 110 when the battery cells swell may be disposed between the battery cells 110. A double-sided tape, a hot melt, etc. may be disposed between the battery cells 110 to bond the battery cells 110.

The end plates 20 may be disposed in surface contact with the surfaces at both ends of the stacking direction of the battery cell-stacked structure 100, that is, the exposed surfaces of the outermost battery cells of the battery cells 110 of the stacking structure 100.

The end plates 20 are components that maintain the distance therebetween, thereby inhibiting deformation of the battery module with their rigidity and maintaining the surface pressure between the stacked battery cells 110 when the battery cells 110 swell. Accordingly, the end plates 20 have sufficient rigidity that can maintain surface contact with the battery cells 110 and can inhibit deformation of the battery module, and an additional component for uniform surface pressure may be provided.

The bus bar assemblies 30 may include bus bars that are disposed on the front side and the rear side of the battery cell-stacked structure 100 and form electrical connection between the electrodes of the battery cells 110 disposed in the front-rear direction in the stacked structure. The bus bar assemblies 30 may include metallic bus bars bonded to the electrodes of the battery cells 110 in an injection-molding structure made of an insulating material such as plastic and may have a connector having pins connected to bus bars, etc., so that the voltage of the battery cell 110 can be detected at the outside.

The bus bars of the bus bar assemblies 30 may have an extension formed for connection with another external battery cell module or terminal and the terminals may be exposed through the front and rear covers 60.

The first clamp 51 and the second clamp 52 extend in the width direction over and under the stacked structure 100 and both ends thereof are respectively bonded to the end plates 20, thereby being able to maintain a predetermined distance between the two end plates 20. In particular, the first clamp 51 and the second clamp 52 are respectively bonded to the longitudinal centers of the two end plates 20, thereby restricting the longitudinal centers of the two end plates 20 when the battery cells 110 swell. Accordingly, it is possible to I the battery module 10 from swelling.

The front and rear covers 60 can cover the surfaces corresponding to the front and rear of the stacked structure 100 in the longitudinal direction of the battery cell-stacked structure 100. The front and rear covers 60 are substantially the same components disposed at symmetric positions on the battery module 10, so they are given the same reference numeral.

When the front and rear covers 60 are installed, the bus bar assemblies 30 are covered and the battery module 10 can be finally completed. The front and rear covers 60 may have through-holes that can expose components that are supposed to be exposed out of the battery module (e.g., the extensions of the bus bars supposed to be exposed for electrical connection with the outside, the connector having the pins electrically connected with the bus bars, etc.) of the components of the bus bar assemblies 30.

Figure 4:
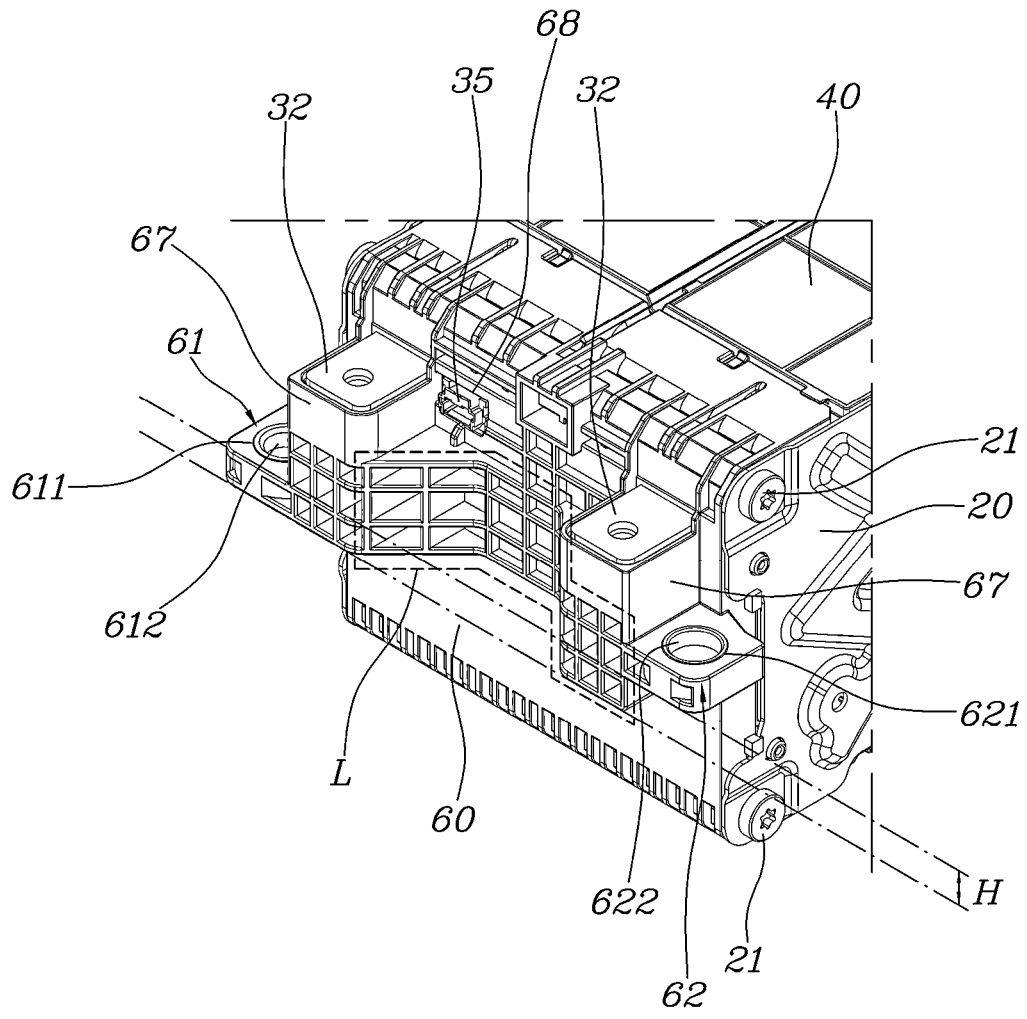
FIG. 4 is a view showing in detail an assembly structure of front and rear covers of the battery module according to one form of the present disclosure.

FIG. 4 is a view showing in detail an assembly structure of front and rear covers of the battery module according to one form of the present disclosure.

Referring to FIG. 4, the front and rear covers 60 of the battery module according to one form of the present disclosure may have cover surfaces 601 facing the front and rear surfaces of the stacked structure 100, and a first fastening portion 61 and a second fastening portion 62 laterally protruding further than both sides of the stacked structure 100 from both ends in the width direction of the cover surfaces 601.

The first fastening portion 61 and the second fastening portion 62 are portions for fastening to another adjacent battery module when a battery pack is formed. The fastening portions 61, 62 respectively may have through-holes 611 and 621 formed in the up-down direction, and an insert nut 612 and a metal bush 622 respectively disposed in the through-holes 611 and 621.

The front and rear covers 60 may have seats 67 protruding forward or rearward from the cover surface 601 to expose the extensions 32 of the bus bars of the bus bar assembly 30 in the battery module 10 to the outside, and a connector hole 68 formed through the cover surface 601 to expose the connector 35 disposed on the bus bar assembly 30 to the outside.

The front and rear covers 60 may have an extension structure L connected to the fastening portions 61, 62 protruding from the cover surface 601. The extension structure L is formed in a lattice structure with holes and can provide rigidity by absorbing shock when shock is applied to the battery module 10. The extension structure L may have a shape extending at an angle from the center of the cover surface 601 to the coupling portions 61, 62 at the height corresponding to the two fastening portions 61, 62.

Side surfaces of the front cover and the rear cover 60 may be in contact with the end plates 20. The end plates 20 and the side surfaces of the second cover and the third cover 30 may be coupled to each other by bolts 21. Though not shown, the two end plates 20 may be fastened by bolts 21 fastened at both ends of a long nut disposed inside each of the covers 60.

Figure 5:
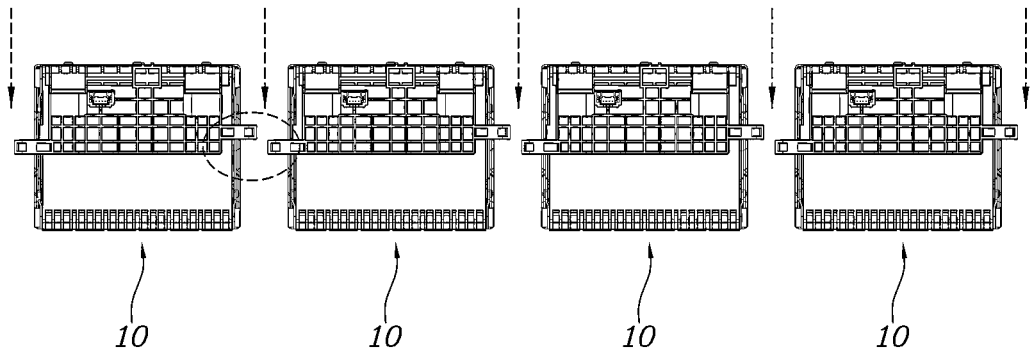
FIG. 5 is a front view showing the state in which a battery pack is configured by combining battery modules according to one form of the present disclosure.
Figure 6:
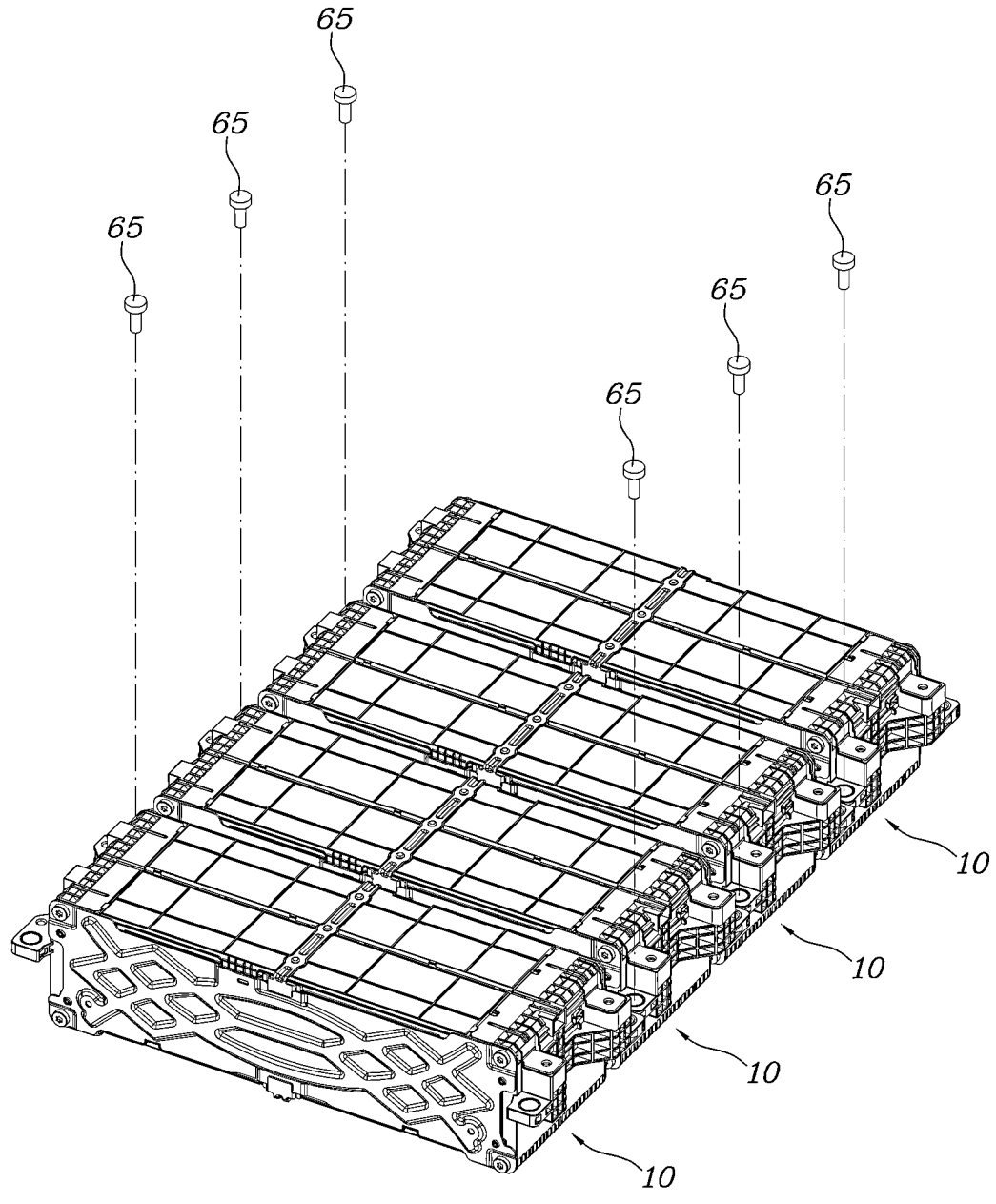
FIG. 6 is a perspective view showing a portion of a battery pack configured by combining a plurality of battery modules according to one form of the present disclosure.

FIG. 5 is a front view showing the state in which a battery pack is configured by fastening battery modules according to one form of the present disclosure and FIG. 6 is a perspective view showing a portion of a battery pack configured by fastening a plurality of battery modules according to one form of the present disclosure.

In this specification, the battery pack may be used as a concept including an assembly formed by combining a plurality of battery modules 10 or an assembly combined with the battery modules 10 and a case in which the assembly is disposed.

As shown in FIGS. 5 and 6, a plurality of battery modules (four in the example shown in FIG. 5) may be laterally arranged and fastened to configure a battery pack. Laterally arranging battery modules means arranging the battery modules in the stacked direction of battery cells in the battery modules. Further, this arrangement is for causing surface pressure to be applied between the battery modules when the battery cells swell.

The fastening portions of the modules are disposed to overlap up and down each other such that through-holes of the fastening portions are aligned when the modules are fastening, and one fastening member may be inserted in the aligned through-holes. The one fastening member may be a hollow bolt 65.

As described above, the first fastening portion 61 and the second fastening portion 62 formed at each of the covers 60 of the battery module 10 may have a height difference H such that the fastening portions of adjacent modules can be aligned. In particular, the height of the lower end of one fastening portion 62 may be substantially the same as the height of the upper end of the other fastening portion 61 such that the fastening portions overlapping each other of adjacent battery modules can be in contact with each other up and down when the two battery modules are fastened.

Figure 7:
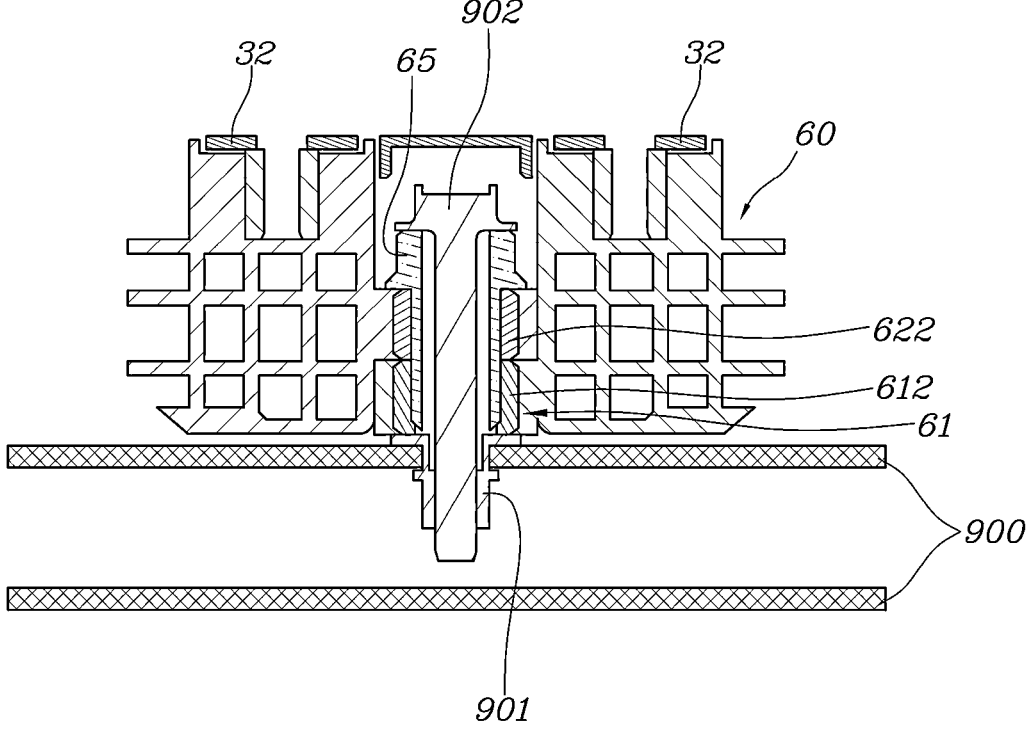
FIG. 7 is a cross-sectional view showing in more detail a coupling portion between battery modules according to one form of the present disclosure.

FIG. 7 is a cross-sectional view showing in more detail the fastening structure of battery modules according to one form of the present disclosure, that is, shows a longitudinally taken cross-section of a region corresponding to 'A' shown in FIG. 6 with battery cells fastened to a case.

Referring to FIG. 7, the second fastening portion 62 of the left battery cell and the first fastening portion 61 of the right battery cell are disposed up and down in the shown state, so the through-holes of the fastening portions can be aligned up and down.

A metal bush 622 is disposed in the through-hole of the second fastening portion 62 disposed up and an insert nut 612 is disposed in the through-hole of the first fastening portion 61 disposed down in the overlapping state when the battery cells are fastened, so the two battery modules can be fastened to each other by fastening a hollow bolt 65 in the overlapping through-holes. That is, the hollow bolt 65 may be inserted into the insert nut 612 in the lower through hole through the metal bush 622 in the upper through-hole, whereby fastening can be completed.

A battery module assembly including several battery modules 10 fastened to each other body the hollow bolt 65 may be fastened and seated in the case 900. In this configuration, a fastening hole in which a member for fastening can be inserted may be formed in the case 900, and a pop nut 901 may be inserted in the fastening hole.

A bolt 902 is inserted in the hole of the hollow bolt 65 fastening the battery modules 10 and the inserted bolt 902 is fastened to the pop nut 901, whereby a battery module assembly including the battery modules 10 can be mounted and seated in the case.

Figure 8:
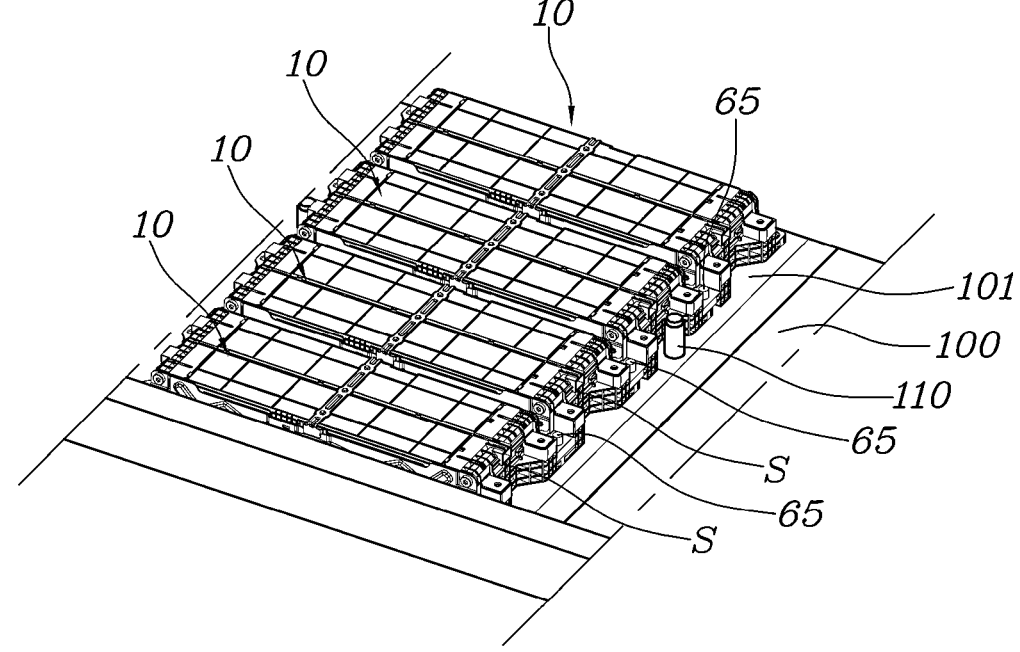
FIG. 8 is a perspective view showing a structure in which battery modules are seated in a lower case in a battery pack according to one form of the present disclosure.

FIG. 8 is a perspective view showing a structure in which battery modules are seated in a lower case in a battery pack according to one form of the present disclosure.

As shown in FIG. 8, the battery cells 10 are fastened to each other and may be mounted and seated in the case 900. The battery cells 10 each may be fastened to an adjacent battery cell and may be fastened to the case at the fastening positions thereof.

Meanwhile, as described above, the extension structures L formed on the front and rear covers 60 may have a shape extending at an angle from the center of the cover surface 601 to the coupling portions 61, 62 at the height corresponding to the two coupling portions 61, 62. Since the extension structures L are formed in this shape, an empty space S may be defined between the two fastening portions 61, 62. Fastening structures for fastening a battery and a vehicle to each other may be disposed in the empty space S.

Although it is exemplified above that the covers 60 substantially having the same structure are disposed on the front side and rear side of the battery module 10, respectively, the present disclosure is not limited to the structure in which the covers 60 substantially having the same structure are disposed on both of the front side and the rear side. That is, as another form of the present disclosure, a cover having the shape and fastening structure described above may be disposed on only one of the front side and the rear side of the battery module 10, and a cover having a different structure may be disposed on the other one.

As described above, the battery module according to various forms of the present disclosure is advantageous in that the fastening portions formed on the front and rear covers of the battery module enable a fastening structure that may be applied for fastening between the battery module and a case concurrently with fastening the battery module with another battery module, thereby further improving the strength of fastening, and this may provide a higher level of robustness against external impacts (for example, collisions). In addition, the fastening structure applied to the battery module according to various forms of the present disclosure removes any unnecessary space between battery modules, thereby increasing space utilization in connection with the overall battery system packaging, and this is very advantageous for standardization and compatibility.

In addition, the battery module according to various forms of the present disclosure is advantageous in that fastening portions are formed such that fastening can be made in the direction in which battery cells are stacked inside the battery module. As a result, when multiple battery modules are fastened, the surface-pressure performance can be improved by the close-contact structure between the battery modules, and assembly convenience is improved, thereby providing various process-related advantages.

Although the present disclosure was described above with reference to specific forms, it would be apparent to those skilled in the art that the present disclosure may be changed and modified in various ways.

What is claimed is:

1. A battery pack comprising a plurality of battery modules, wherein each battery module of the plurality of battery modules includes:

a stacked structure including a plurality of stacked battery cells; and a front cover and a rear cover respectively disposed on a front side and a rear side of the stacked structure, configured to cover the stacked structure, and each of the front cover and the rear cover including a cover surface facing the stacked structure, a first fastening portion protruding from the cover surface in a left direction with respect to the stacked structure, and a second fastening portion protruding from the cover surface in a right direction with respect to the stacked structure, wherein the first fastening portion and the second fastening portion of the front cover protrude in a front direction from the cover surface of the front cover and have different heights from each other, wherein the first fastening portion and the second fastening portion of the rear cover protrude in a rear direction from the cover surface of the rear cover and have different heights from each other, and wherein a first battery module and a second battery module of the plurality of battery modules are arranged adjacent to each other in a stacking direction, the first fastening portion of the first battery module the second fastening portion of the second battery module overlap each other in a height direction in an arranged state and are fastened to each other.

2. The battery pack of claim 1, wherein the first fastening portion includes an upper end and the second fastening portion includes a lower end, and the upper end of the first fastening portion and the lower end of the second fastening portion are located at a substantially same height.

3. The battery pack of claim 1, wherein the first fastening portion and the second fastening portion each include a through-hole formed therethrough in an up-down direction of the battery pack, the through-hole of the first fastening portion of the first battery module and the through-hole of the second fastening portion of the second battery module are aligned with each other in the height direction.

4. The battery pack of claim 3, further comprising:
a metal bush disposed in the through-hole of the first fastening portion that is positioned higher than the second fastening portion; and
an insert nut disposed in the second fastening portion.

5. The battery pack of claim 3, further comprising a fastening member inserted in the through-holes of the first fastening portion of the first battery module and of the second fastening portion of the second battery module, and configured to fasten the first and the second battery modules to each other.

6. The battery pack of claim 5, wherein the fastening member is a hollow nut.

7. The battery pack of claim 4, further comprising a hollow nut inserted in the through-holes of the first fastening portion of the first battery module and of the second fastening portion of the second battery module, and coupled to the insert nut through the metal bush.

8. The battery pack of claim 1, wherein each of the front cover and the rear cover further includes an extension structure, wherein the extension structure is connected to the first fastening portion and the second fastening portion from the cover surface and is formed in a lattice structure having holes.

9. The battery pack of claim 8, wherein the extension structure has a structure extending at an angle from a center of the cover surface to the first fastening portion and the second fastening portion, and an empty space is defined between the first fastening portion and the second fastening portion.

\* \* \* \* \*